Jan. 27, 1925.
W. T. BURNS
1,524,082
SHAFT HANGER BEARING
Filed Sept. 27, 1923
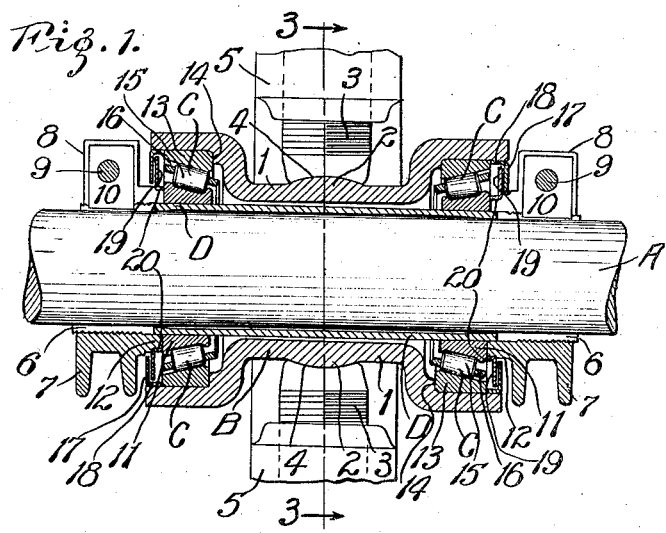
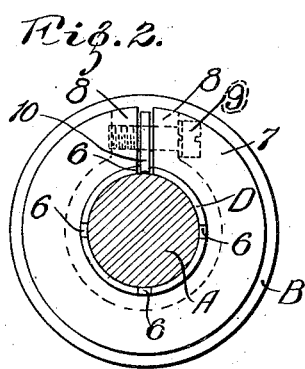
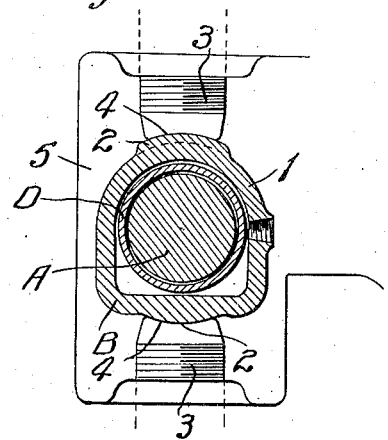
INVENTOR:
William T. Burns,
by Carr & Carr,
HIS ATTORNEYS.

Patented Jan. 27, 1925.

1,524,082

UNITED STATES PATENT OFFICE.

WILLIAM T. BURNS, OF CANTON, OHIO, ASSIGNOR TO THE TIMKEN ROLLER BEARING COMPANY, OF CANTON, OHIO, A CORPORATION OF OHIO.

SHAFT-HANGER BEARING.

Application filed September 27, 1923. Serial No. 665,098.

*To all whom it may concern:*

Be it known that I, WILLIAM T. BURNS, a citizen of the United States, and a resident of the city of Canton, in the county of Stark and State of Ohio, have invented a new and useful Improvement in Shaft-Hanger Bearings, of which the following is a specification.

My invention relates to shaft hanger bearings of the type in which conical rollers are used as antifriction members and it has for its principal objects a simple and efficient form of bearing, which can be used to replace the antifriction members of shaft hanger bearings now commonly used, that will hold a shaft against all ordinary endwise movement, but which will permit endwise movement under extraordinary stresses, that will accommodate a shaft that is inaccurate in size or straightness, and that will prevent leakage of lubricant from the bearings.

The invention consists principally in the combination with a hanger box and shaft of a sleeve mounted on said shaft and secured thereto at the ends only and conical roller bearings interposed between the sleeve and the hanger box. The invention further consists in the parts and combinations of parts hereinafter described and claimed.

In the accompanying drawing,

Fig. 1 is a longitudinal sectional view of a shaft hanger bearing embodying my invention;

Fig. 2 is an end view showing particularly one of the clamp rings that holds the sleeve on the shaft; and Fig. 3 is a transverse sectional view on the line 3—3 of Fig. 1.

A shaft A extends through a hanger box B in the ends of which are mounted conical roller bearings C. The hanger box is of reduced diameter in its middle or body portion 1 and is provided with projections 2 of spherical shape that cooperate with screws 3 having corresponding spherical shaped depressions 4 in the ends, said screws being mounted in a suitable supporting member 5 whereby the hanger box is held in position.

Mounted on the shaft A is a sleeve D that is of slightly larger diameter than the shaft, so that the sleeve fits loosely on the shaft. The ends of the sleeve are provided with longitudinal slots 6 and are externally threaded. Mounted on each threaded portion of the sleeve is a split ring 7 that is internally threaded to fit the threads of the sleeve. The meeting ends of each split ring 7 are provided with lugs 8 that are secured together as by means of a screw 9 passing therethrough. The tightening of the screw 9 draws the ends of the ring 7 towards each other and causes the ring to be clamped firmly on the sleeve B, thus drawing the sleeve tight on the shaft. Mounted on each screw 9 or otherwise secured between the ends of each ring is a locking plate 10 that fits into one of the slots 6 in the sleeve, thus holding the proper adjustment of the sleeve and clamp rings, and holding the bearing cones in place. The cones 11 of the roller bearings C are mounted on the sleeve B adjacent to the threaded portions and the clamp rings 7 are provided with annular ribs 12 forming nuts that abut against the ends of the cones. The position of each cone may be changed by moving the adjacent clamp ring 7 and nut portion 12 lengthwise of the sleeve. The cups 13 or outer bearing members are mounted in the ends of the hanger box, suitable shoulders 14 being provided to form abutments therefor. The conical rollers 15 are interposed between the cups and cones, said rollers being preferably provided with suitable cages 16.

A flat ring 17 is secured in each end of the hanger box as by a tubular extension 18; and a flat ring 19 is secured on the annular rib 12 of each clamp ring, as by a tubular extension 20. The two rings 17 and 19 overlap and form a seal for the lubricant in the bearing.

The shaft is normally held against endwise movement; but under extraordinary conditions, it may creep endwise through the sleeve. The sleeve fits loosely on the shaft except at its end portions; and thus irregularities in the size or straightness of the shaft are accommodated. The sleeves are clamped to the shaft all around the circumference, instead of being held at one point by a set screw or the like and there is no tendency for the roller bearing assembly to run eccentric with relation to the shaft. The bearings may be adjusted and they are firmly secured in place. The antifriction members of line shaft hanger bearings now in use may be replaced with the bearing hereinbefore described.

Obviously, numerous changes may be made without departing from the invention and I do not wish to be limited to the precise construction shown.

What I claim is:

A bearing for shafting comprising a hanger box, a shaft extending therethrough, a sleeve mounted on said shaft, conical roller bearings interposed between said sleeve and said hanger box, the ends of said sleeve being slotted lengthwise and being externally threaded, split rings threaded on to the ends of said sleeve, said rings having annular ribs abutting against the inner bearing members of said conical roller bearings, and locking plates secured to said rings and each adapted to fit into a slot of said sleeve.

Signed at Canton this 19th day of September, 1923.

WILLIAM T. BURNS.